United States Patent [19]
Stuart et al.

[11] Patent Number: 5,187,398
[45] Date of Patent: Feb. 16, 1993

[54] ELECTROMAGNETIC ACTUATOR

[75] Inventors: Keith O. Stuart, Cypress; Dennis C. Bulgatz, Reseda, both of Calif.

[73] Assignee: Aura Systems, Inc., El Segundo, Calif.

[21] Appl. No.: 855,771

[22] Filed: Mar. 23, 1992

Related U.S. Application Data

[63] Continuation-in-part of Ser. No. 499,046, Mar. 26, 1990, Pat. No. 5,099,158, which is a continuation-in-part of Ser. No. 319,956, Mar. 7, 1989, Pat. No. 4,912,343, which is a continuation-in-part of Ser. No. 238,925, Aug. 31, 1988, abandoned.

[51] Int. Cl.$^5$ .................................. H02K 41/00
[52] U.S. Cl. ...................... 310/14; 280/840; 280/690; 310/30
[58] Field of Search .............. 310/14, 30, 34, 35; 335/255, 256, 266, 279; 280/703, 707, 690, 840

[56] References Cited

U.S. PATENT DOCUMENTS

| | | | |
|---|---|---|---|
| 4,542,311 | 9/1985 | Newman et al. | 310/13 |
| 4,892,328 | 1/1990 | Kurtzman et al. | 280/707 |
| 5,028,073 | 7/1991 | Harms et al. | 280/707 |
| 5,087,868 | 2/1992 | Ishibashi et al. | 318/696 |
| 5,099,158 | 3/1992 | Stuart | 310/14 |

*Primary Examiner*—Steven L. Stephan
*Assistant Examiner*—Judson H. Jones
*Attorney, Agent, or Firm*—Anthony T. Cascio; Lisa A. Clifford

[57] ABSTRACT

An electromagnetic actuator includes a magnetic flux conductive material case, an electrical current conductive coil, a magnetic flux conductive material core, and a pair of radially polarized magnetic flux developing elements. The coil is disposed in the case coextensively adjacent to its interior wall. The core is movably received within the chamber with motion of the core occurring between the first end and the second end of the case such that a first region of the core traverses the coil between its first end and its midpoint, and a second region of the core traverses the coil between its second end and its midpoint. A first one of the magnetic elements is carried by the first region and a second one of the magnetic elements is carried by the second region so that magnetic flux across the coil between the first region and the case is in a first direction, and magnetic flux across the coil between the second region and the case is in a second direction. The coil is arranged so that an electrical current in the coil between the first coil and the midpoint flows in an opposite direction with respect to the direction of the current in the coil between the second coil and the midpoint. Therefore, the flux current cross product of the flux in the first direction with the coil current and the flux current cross product of the flux in the second direction with the coil current are additive.

12 Claims, 3 Drawing Sheets

ELECTROMAGNETIC ACTUATOR

RELATED APPLICATION DATA

The present application is a continuation in part of co-pending U.S. patent application Ser. No. 07/499,046, filed Mar. 26, 1990, and to be issued as U.S. Pat. No. 5,099,158 on Mar. 24, 1992 (the "'158 patent"); which in turn is a continuation in part of U.S. patent application Ser. No. 07/319,956, filed Mar. 7, 1989, now U.S. Pat. No. 4,912,343, issued Mar. 27, 1990 (the "'343 patent"); which in turn is a continuation in part of U.S. patent application Ser. No. 07/238,925, filed Aug. 31, 1988, now abandoned; each of which has been assigned to the assignee of the invention described in the present application and which are incorporated herein by reference.

FIELD OF THE INVENTION

The present invention relates generally to electromagnetic actuators, and more particularly to an improved electromagnetic actuator capable of providing relatively large output forces in response to relatively low-level electrical input signals when compared to actuators of similar design.

BACKGROUND OF THE INVENTION

Electromagnetic actuators are well known. In many applications, the output force of the actuator is controlled by and is a function of an electrical control or command signal, and as such can be used in a variety of applications. One type of electromagnetic actuator is the "linear" actuator wherein output force is linearly proportional to the input electrical current. For example, as described in U.S. Pat. No. 4,892,328, issued Jan. 9, 1990 and assigned to the assignee of the invention disclosed in the present application (hereinafter the "'328 patent"), one type of a linear electromagnetic actuator is employed as part of an electromagnetic strut assembly in a vehicle suspension system for controlling the level and orientation of the vehicle sprung mass relative to the vehicle unsprung mass. More particularly, a radially polarized permanent magnet is carried by the sprung mass and is disposed coaxially within a coil carried by the unsprung mass. A current is applied to the coil in an amplitude and polarity selected to develop an axial force which maintains the orientation of the sprung and unsprung mass in a predetermined orientation.

In the '328 patent, the radially polarized magnet is mounted on an elongated rod made of magnetically "soft" iron to provide a flux return path to the radially inner pole of the magnet. Accordingly, the magnetic flux which is developed from the radially outward pole and which radially passes through the coil must be directed by some means to either end of the elongated rod so that there is a complete magnetic circuit. However, the flux path external of the coil for return to the elongated rod cannot again pass through the coil. Otherwise, the coil current interacting with the return flux will develop a force in opposition to the force developed by the coil current interacting with the flux at the radially outer pole of the permanent magnet. Therefore, to keep the flux path between the ends of the elongated rod external of the coil, the coil is housed in a non-magnetic material housing with the flux path external of the coil being through the vehicle spring and upper and lower spring seats between which the elongated rod carrying the radially polarized magnet is connected. However, the non-magnetic material housing provides a high reluctance flux path which decreases the flux density across the coil from the outer radial pole of the permanent magnet, thereby decreasing the overall efficiency of the device.

An improved linear electromagnetic actuator, as described in the '343 patent, overcomes the above described limitation. The actuator of the '343 patent is capable of providing relatively large output forces in response to relatively small level command signal. As set forth in the '343 patent, the actuator comprises first and second cylindrical assemblies coaxially mounted and movable relative to one another along a common axis of relative movement.

The first assembly includes three coils, each of different radius, disposed coaxially about the axis of relative movement. The second assembly includes at least a pair of axially spaced apart cylindrical magnets, each radially polarized so that flux is directed in a radial direction from each magnet between the inner and intermediate coils. At least a second pair of similar magnets are positioned between the intermediate and outer coils. The magnets are polarized so that one of the magnets of each set provides flux in a radially inward direction while the other magnet of each set provides flux in a radially outward direction. The magnets providing the inwardly directed flux are axially aligned, as are the magnets providing the outwardly directed flux so that the magnets of each polarity orientation provide all of the radial flux through the same sections of the coil assembly.

The second assembly also includes a center core member positioned inside of the inner coil and a cylindrical tube positioned around the outer coil, both coaxial with the axis of relative movement to provide an axial return path for the radial flux developed by the magnets. Brushes are provided between the sets of magnets and at the opposite ends of the magnets for applying control current in the coils in one direction through the inwardly directed flux and in the other direction to the outwardly directed flux so that the current/flux force created in accordance with Lorenz' Law will be additive. In the embodiment shown in the '343 patent, the magnets, core element and outer cylinder all move relative to the coils in response to the force provided. The magnets are preferably made of a high magnetic energy product material producing relatively high flux density, such as for example, neodymium-iron-boron or samarium cobalt.

The actuator shown in the '343 patent provides relatively high output forces in response to relatively low command signals as compared to the electromagnetic device disclosed in the '328 patent. Since the first and second assemblies move relative to each other, either assembly may be used to actuate an external device. However, the coil assemblies alone, whether structurally stationary with respect to the actuator device or coupled to the actuator device, may not be sufficiently structurally rigid to withstand the forces applied between the two assemblies. Furthermore, if the core, outer cylinder and intermediate cylindrical sections which carry the permanent magnets are coupled to the actuated device, additional weight is added to the actuated mass, requiring higher currents or reducing bandwidth.

To impart sufficient structural integrity to the coil, the coil may be carried by the core, and the radially polarized magnets may then move in a separate assembly external of the coil as shown in either FIG. 4 or FIG. 6 of the '158 patent. In FIG. 4 of the '158 patent, electrical connection is made to the coil through brushes which are carried with the moving magnet assembly. In FIG. 6 of the '158 patent, brushes are eliminated by providing for a first half of the coil to be counterwound with respect to the second half of the coil. The magnets with the flux radial in the first direction will move along the first coil half and the magnets with the opposite radial polarization will move along the counterwound coil half such that a current through the coil will interact with the flux to develop an additive force so that the first and second assemblies move relative to each other.

Yet another type of actuator providing support for the coil is shown in Prior Art FIG. 1. More particularly, FIG. 1 shows shows a prior art actuator 10 which is commercially available from Northern Magnetics of Van Nuys, Calif. The prior art actuator 10 includes magnetic flux conductive cylindrical case 12 having an inner wall 14 extending between a first end 16 and second end 18 of the case 12. An electrical current conductive coil 20 is wound on a nonmagnetic material coil carrier 21. The carrier 21 is coaxially secured within the case 12 with the windings of the coil 20 being intermediate the carrier 21 and the inner wall 14. The windings are made from thin copper wire.

A core assembly 19 includes an axially polarized cylindrical magnet 22 having a first magnetic pole at its first end 24 and a second opposite magnetic pole at its second end 26. A first disc shaped magnetic flux conductive material pole piece 28 is attached to the first end 24 of the permanent magnet 22. A second magnetic flux conductive material pole piece 30 is connected to the second end 26 of the permanent magnet 22.

The permanent magnet 22 and the first and second pole pieces 28, 30 are coaxially mounted to a cylindrical rod 32 which, in turn, is coaxially received by end caps 34, 36 in axial slidable engagement. Each end cap 34, 36 is attached to the cylindrical case 12. The rod 32 is received in slidable engagement in coaxial bores 38, 40 in each respective end cap 34, 36. It is to be noted that the cylindrical rod 32 and end caps 34, 36 are of nonmagnetic material. The cylindrical bores 38, 40 may include bearings (not shown) to reduce frictional losses. The actuator 10 is one type of moving core actuator.

Accordingly, the first pole piece 28 provides flux in a radial first direction across the coil 20 and the second pole piece 30 provides flux in the opposite radial direction across the coil 2. Ideally, the flux is confined to the case 12 in the axial section between the present position of the first pole piece 28 and the second pole piece 30. Thus, if current is put into the coil 20 at its midpoint 42, with the current return being at a first end 44 and a second end 46, with each end 44, 46 connected in common, then the current flux cross product with each pole piece 28, 30 will be additive. Alternatively, the coil 20 of the prior art actuator 10 may also be counterwound at either side of the midpoint 42 as set forth in the '158 patent.

However, the ideal flux confinement does not exist. Since the magnet 22 is axially polarized, there will be leakage of the flux from the first pole piece 28 to the second pole piece 30 at the point they are attached to the rod 32 through the center bore of the rod 32. Furthermore, a flux path will emanate from the tops of the first pole piece 28 and the second pole piece 30 external of the case 12 since the tops of the pole pieces merely extend the axial polarization of the magnet 22. Accordingly, not all the available flux from the magnet 22 is being utilized to provide radial flux in confined axial regions of the coil 20. This flux loss reduces the total output power available from the actuator 10.

Furthermore, to obtain a radially polarized high flux density which remains constant in the axial direction, each pole piece 28, 30 must be relatively thin in their axial dimension. Otherwise, the flux density will be at a maximum where each pole piece 28, 30 is adjacent to cylindrical magnet 22 and decrease in the axial direction away from the cylindrical magnet 22. Enlarging the axial dimension of the pole pieces 28, 30 will also not change the total flux across the coil since the total available flux is determined by the permanent magnet 22. Therefore, only a small portion of the total current within the coil 20 is available to interact with a high flux density for producing an axial force since the high density radial flux is confined to a very narrow axial region. Therefore, much higher currents and power consumption are required for the prior art actuator 10 to achieve the same types of output forces available through the actuators disclosed in the above-referenced patents.

Another limitation on the total output force available from the prior art actuator 10 is due to the coil carrier 21 being disposed between the pole pieces 28, 30 and the coil 20. The nonmagnetic material carrier 21 enlarges the gap in which the flux is confined, thereby reducing field strength.

SUMMARY OF THE INVENTION

Accordingly, it is a primary object of the present invention to overcome one or more disadvantages and limitations of the actuator identified in prior art FIG. 1. A significant object of the present invention is to provide a moving core linear actuator which obtains high flux densities in a radial direction across larger axial lengths of the coil than in the prior art.

According to a broad aspect of the present invention, an electromagnetic actuator includes a magnetic flux conductive material case, an electrical current conductive coil, a magnetic flux conductive material core, and a pair of magnetic flux developing elements. The case has a first case end, a second case end, and an interior wall extending between the first case end and the second case end. The interior wall defines a chamber within the case. The coil is disposed in the chamber coextensively adjacent to the interior wall. The coil has a first coil end disposed proximate to the first case end, a second coil end disposed proximate to the second case end, and a midpoint. The core has a first core end, a second core end, and an exterior wall extending between the first core end and the second core end. The exterior wall of the core has a first region adjacent to the first core end and a second region adjacent to the second core end. The core is movably received within the chamber with motion of the core occurring between the first case end and the second case end such that the first region traverses the coil between the first coil end and the midpoint, and the second region traverses the coil between the second coil end and the midpoint. The coil and the exterior wall are in a facing relationship with respect to each other. Each of the magnetic flux developing elements has a first pole face of a first magnetic polarity and a second pole face of a second, opposite magnetic polarity. The first one of the magnetic elements is carried by the first region with its first pole face being adjacent to the first region and its second pole face being distal from the first region in a spaced apart relationship to the coil. A second one of the magnetic elements is carried by the second region with its first pole face being distal from the second region in a spaced apart relationship to the coil and its second pole face being adjacent to the second region. Magnetic flux across the coil between the first region and the interior wall of the case is in a first direction, and magnetic flux across the coil between the second region and the interior wall of the case is in a second direction in opposition to the first direction. The coil is arranged so that an electrical current in the coil between the first coil end and the midpoint flows in an opposite direction with respect to the direction of the current in the coil between the second coil end and the midpoint. Therefore, the flux current cross product of the flux in the first direction with the coil current and the flux current cross product of the flux in the second direction with the coil current are additive.

A feature of the present invention is that the use of the magnetic elements on the exterior wall of the core puts a magnetic pole face adjacent to the coil such that the flux density from such magnetic pole face is constant across the coil. Therefore, the pole face can be made axially larger than the pole piece of the prior art so that coil current interacts with larger flux to produce greater output force for a given current. An advantage of the present invention is that by being able to use lower current for a given output force, resistive losses in the coil are minimized.

Another feature of the present invention is that the coil may be formed from a relatively thin, but wide, insulated rectangular stock and edge wound to produce a self supporting coil structure. This self supporting structure eliminates the need for a coil carrier, as in the prior art, and allows the gap between the coil and pole face of the magnetic element to be minimized to increase, advantageously, the magnetic field strength through the coil.

Another feature of the present invention is that for any axially directed flux return path within the core, such flux path is confined within the magnetic flux conductive material, even if the core is hollow. This advantageously eliminates flux leakage which is present in the hollow center of the rod of the prior art actuator. This advantage arises from the feature of the pole faces of the magnetic elements being adjacent to the core confine. This feature also eliminates the external flux leakage present in the prior art actuator.

These and other objects, advantages and features of the present invention will become readily apparent to those skilled in the art from a study of the following description of an exemplary preferred embodiment when read in conjunction with the attached drawing and appended claims.

DESCRIPTION OF AN EXEMPLARY PREFERRED EMBODIMENT

Figure 2:
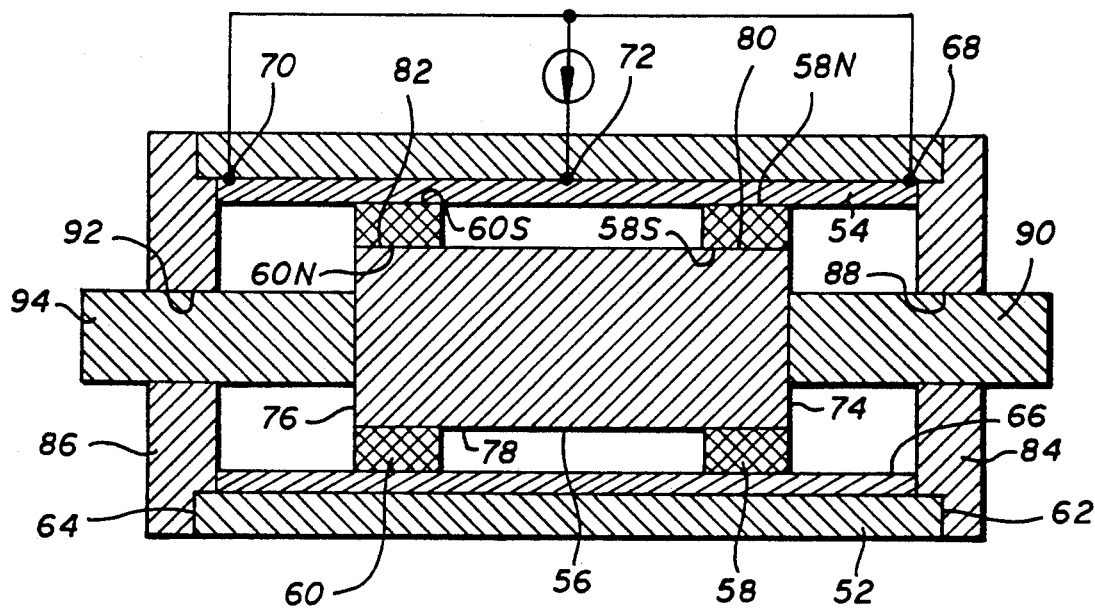
FIG. 2 is a cross sectional view of the electromagnetic actuator constructed according to the principles of the present invention.

Referring now to FIG. 2, there is shown a linear electromagnetic actuator 50 constructed according to the principles of the present invention. The actuator 50 includes a case 52, an electrical current conductive coil 54, a core 56, and a pair of magnetic flux developing elements 58, 60. Although each of the above-mentioned elements of the actuator 50 will be described hereinbelow as being cylindrical in construction and coaxially disposed with respect to each other, it is to be understood that other geometries which satisfy the cooperation between the elements are within the scope of the present invention.

The case 52 is an elongated cylinder fabricated from magnetic flux conductive material. The case 52 has a first case end 62, a second case end 64, and an interior wall 66 extending axially between the first case end 62 and the second case end 64. The interior wall 66 defines a chamber within the cylindrical case 52.

The coil 54 is disposed in the chamber coextensively adjacent to the interior wall 66. The coil 54 has a first coil end 68 disposed proximate the first case end 62 and a second coil end 70 disposed proximate the second case end 64. The coil 54 further has a midpoint 72. As will be described in greater detail hereinbelow, the first coil end 68, the second coil end 70 and the midpoint 72 are provided so that electrical connection may be made to the coil 54.

The core 56 is a cylinder of magnetic flux conductive material. The core 56 has a first core end 74, a second core end 76, and a cylindrical exterior wall 78 extending between the first core end 74 and the second core end 76. The exterior wall 78 has a first region 80 adjacent the first core end 74 and a second region 82 adjacent the second core end 76.

The core 56 is coaxially received in the chamber of the case 52 and mounted therein in axially slidable engagement. Accordingly, the cylindrical exterior wall 78 of the core 56 is radially spaced from the coil 54. Motion of the core 56 occurs between the first case end 62 and the second case end 64 such that the first region 80 traverses the coil 54 in the axial direction between the first coil end 68 and the midpoint 72, and the second region 82 axially traverses the coil 54 between the second coil end 70 and the midpoint 72.

The magnetic elements 58, 60 are radially polarized and each have a first pole face 58S, 60S of a first magnetic polarity and a second pole face 58N, 60N of a second magnetic polarity opposite the first polarity. The first magnetic element 58 is carried by the first region 80, with its first pole face 58S being adjacent the first region 80 and its second pole face 58N being radially distal from the first region in a spaced relationship to the coil 54. Similarly, the second magnetic element 60 is carried by the second region 82. The first pole face 60S of the second magnetic element 60 is radially distal from the second region 82 in a spaced relationship to the coil 54 and its second pole face 60N is adjacent the second region 82.

Accordingly, the magnetic flux developed by the magnetic flux developing elements 58, 60 is radially confined between the first region 80 and the axial section of the interior wall 66 facing the first region 80 and further confined between the second region 82 and the axial section of the interior wall 66 facing the second region 82. Furthermore, since the first magnetic element 58 is of reverse polarity to the second magnetic element 60, the radial flux between the first region 80 and the interior wall 66 will be in the first direction and the radial flux between the second region 82 and the interior wall 66 will be in the second opposite radial direction. Since magnetic flux will follow the path of lowest reluctance, the axially directed flux will occur in the core 56 between the first region 80 and the second region 82 and in the case 52 in an axial portion where the core 56 is present. For similar reasons, the flux emanating radially from the pole face 58N or the pole face 60S will not tend to fringe in an axial direction within the chamber of the case 52.

The coil is arranged so that an electrical current in the coil between the first coil end 68 and the midpoint 72 flows in an opposite direction with respect to the direction of the current in the coil between the second coil end 70 and the midpoint 72. Accordingly, the flux current cross product of the flux in the first radial direction between the pole face 58N and the current in the coil 54 and the flux current cross product of the flux in the second radial direction from pole face 60S and the current in the coil 54 are additive.

As best seen in FIG. 2, the coil current is flown in opposite direction, as hereinabove described, by applying the current to the midpoint 72 of a coil which is continuously wound along its axial length. The first coil end 68 and the second coil end 70 are connected in common to provide a current return path to the source of current.

Figure 3:
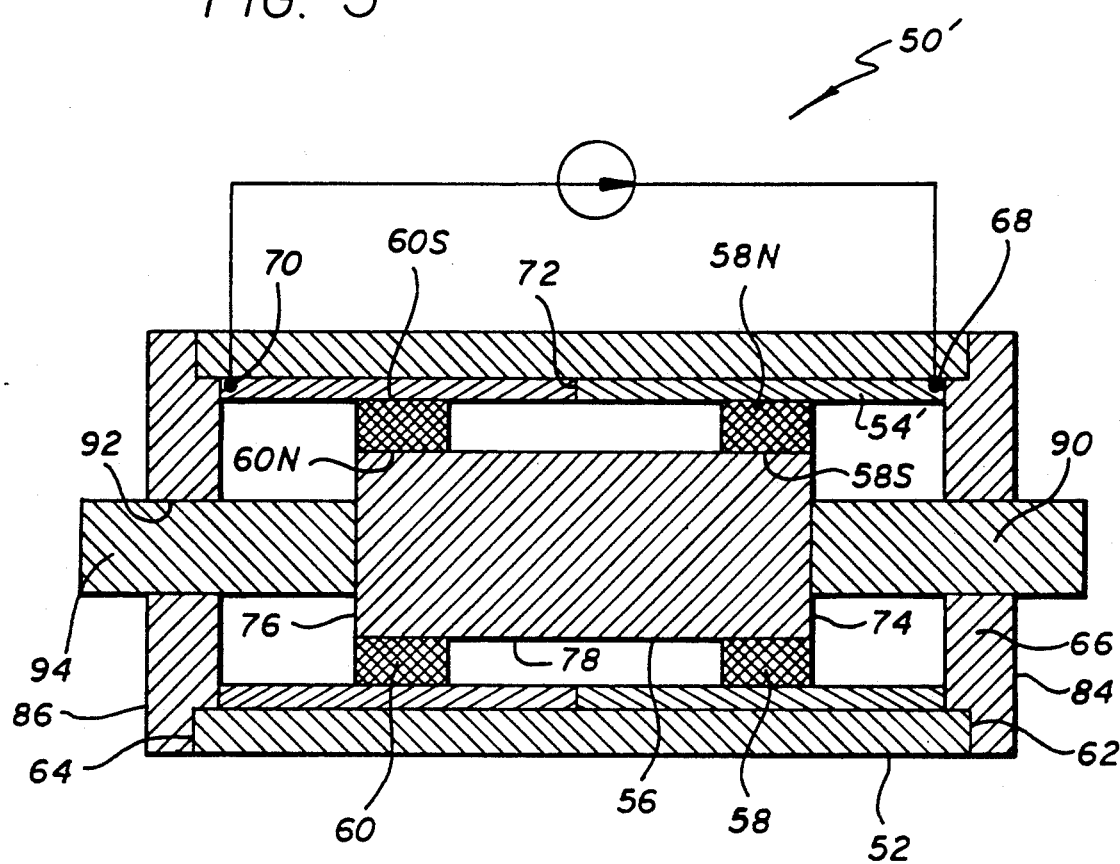
FIG. 3 is a cross sectional view of an alternative embodiment of the electromagnetic actuator of FIG. 2.

With reference to FIG. 3 there shows a linear actuator 50', which is an alternative embodiment of the linear actuator 50 described with reference to FIG. 2. In the linear actuator 50' prime, the coil 54' is wound in a first direction between its first coil end 68 and the midpoint 72, and counterwound in a second direction between the midpoint 72 and the second coil end 70. Such counterwound coil is described in conjunction with FIG. 6 in the '158 patent. Accordingly, a current applied to the first coil end 68 with the current return taken from the second coil end 70 will provide for a reverse of a direction of current at the midpoint 72 so that the flux current cross product in the actuator is additive, as described hereinabove.

Each of the magnetic elements 58, 60 are in the above-described embodiment of the present invention radially polarized cylindrical magnets. It is also possible to construct such polarized magnetic elements 58, 60 from a series of rectangular bar magnets disposed edge to edge about either the first region 80 or second region 82 to approximate a radially polarized cylindrical magnet. Such construction of bar magnets is described in conjunction with FIG. 3 of the '158 patent.

In either the linear actuator 50 of FIG. 2, or the linear actuator 50' of FIG. 3, the construction may further include a first end cap 84 and a second end cap 86. Each end cap 84, 86 is fabricated from nonmagnetic material. The first end cap 84 attaches to the first end 62 of the case 52 and the second end cap 86 attaches to the second end 64 of the case 52, as best seen in either FIG. 2 or FIG. 3. The first end cap 84 has a coaxial bore 88. A rod 90, fabricated from nonmagnetic material, is received in axial slidable engagement within the bore 88 and attaches to the first end 74 of the core 56. The rod provides for external connection of an actuated device (not shown) to the moving core 56. The bore 88 may include linear bearings or bushings 89 as is well known in the art.

If double ended action of the actuator 50 or actuator 50' is desired, the second end cap 86 may include a coaxial bore 92. A second rod 94 is received within the bore 92 in axially slidable engagement and attaches to the second end 76 of the core 56. Similarly, the bore 92 may also include linear bearings or bushings 93.

The relative movement of the flux developing elements 58, 60 with respect to the case 52 will cause eddy currents to be developed on the interior wall 66. These eddy currents will produce an electromotive force opposing the motion of the core 56 with respect to the case 52. In some applications, this natural damping effect is desirable. However, to eliminate such eddy currents, a current suppression laminate may be disposed in the interior wall 66 and adjacent to coil 54 or the coil 54'. The use of such laminates is well known in the art.

Figure 4:
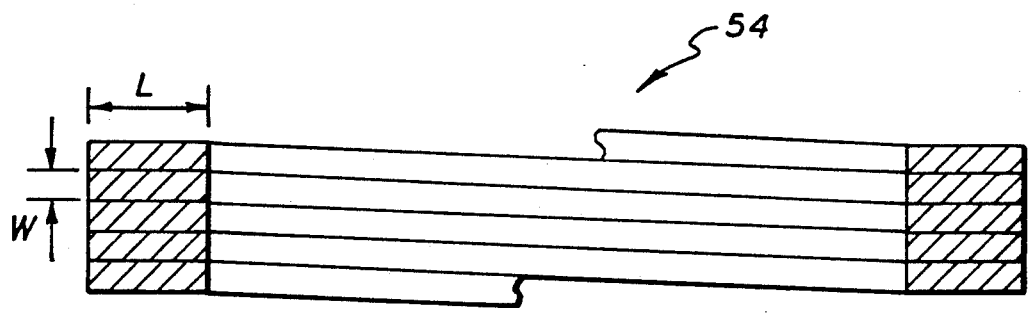
FIG. 4 is a fragmentary view of a portion of an edge wound coil.

With reference to FIG. 4, there is shown a fragmentary view of the coil 54 (or 54'). The coil 54 is preferably constructed from wire of rectangular cross section and edge wound so that the length L of the wire is radially directed and its width W is axially directed. Construction of such edge wound coils is fully set forth in the '158 patent.

Figure 5:
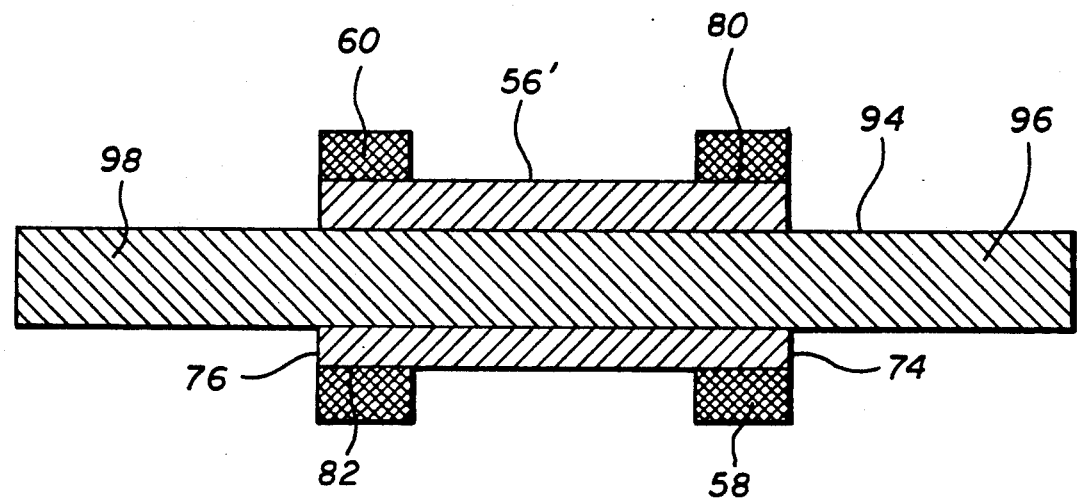
FIG. 5 is a cross sectional view of an alternative embodiment of the core shown in FIG. 2 or FIG. 3.

With reference to FIG. 5, there is shown a core 56' which is an alternative embodiment of the core 56 described in reference to FIG. 2 or FIG. 3. The core 56' is of hollow cylindrical construction and fabricated from magnetic flux conductive material. The core 56' is mounted on a cylindrical rod 94 fabricated from non-magnetic material. A first end 96 of the rod 94 is received within the bore 88 of the first end cap 84 and a second end 98 of the rod 94 is received within the bore 92 of the second end cap 86. Bearings or bushings 89, 93 may also be printed.

In core 56', the magnetic elements 58, 60 are mounted to the respective one of the first or second regions 80, 82 as described hereinabove. In either embodiment of core 56 or core 56', the axial flux will be confined to the core material because a pole face of the magnetic elements 58, 60 is adjacent to the core material. Any flux emanating from one pole face will seek the path of lowest reluctance to the next opposite polarity pole face. With either core 56 or core 56' this path is always within magnetic flux conductive material with respect to the pole faces adjacent the core 56 or 56'. For those pole faces distal from the core 56 or 56', the lowest reluctance flux path is radial across the gap to the inner wall 66 of the case 52. Axial fringing is obviated by the fact that the flux path for such axial fringing is longer and, hence, of higher reluctance than the smallest radial path from the pole face.

Figure 1:
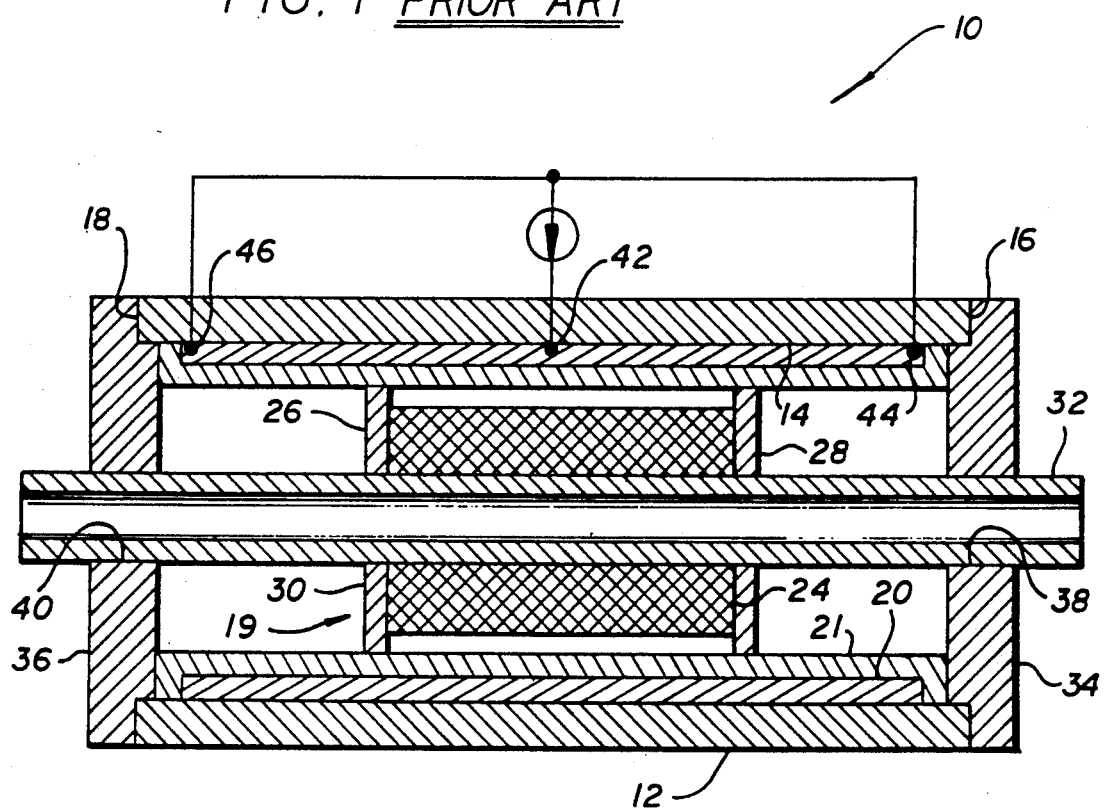
FIG. 1 (Prior Art) is a cross sectional view of the commercially available electromagnetic actuator used to illustrate the current state of the prior art.

Therefore, in actuator 50 or actuator 50', with either core 56 and 56', the flux path between pole faces of the magnetic elements is either confined to magnetic material between opposite polarity pole faces or cross a gap with a pole face facing such gap. In either instance, flux leakage is obviated for the above-stated reasons. In the prior art device of FIG. 1, a gap occurs across magnetic material only without a pole face of a magnet adjacent such gap. Therefore, the high reluctance discontinuity of such gap in the prior art will cause the flux to fringe about such gap causing leakage described in conjunction with the prior art device.

Figure 6:
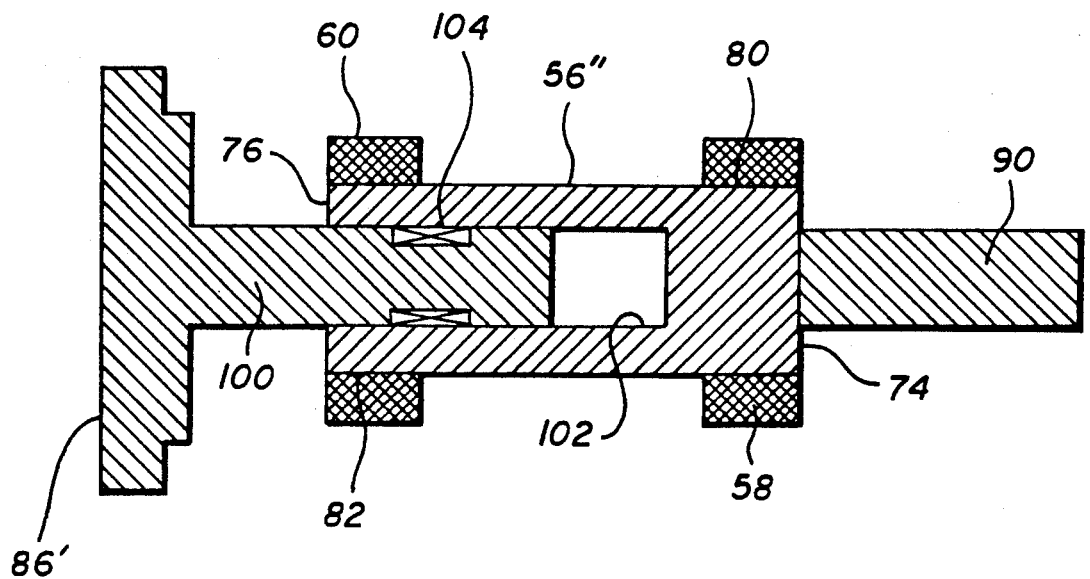
FIG. 6 is a cross sectional view of another alternative embodiment of the core shown in FIG. 2 or FIG. 3.

With reference to FIG. 6, there is shown core 56" as carried, in axial slidable engagement, to a second end cap 86'. The second end cap 86 includes a post 100 extending coaxially toward the core 56". The core 56" includes a bore 102 dimensioned to receive the post 100 in slidable engagement. Bearings or bushings 104 may also be mounted to the post 100. The first rod 90 is received through the bore 88 of the first end cap 84 as hereinabove described.

There has been described hereinabove an exemplary preferred embodiment of the linear actuator according to the principles of the present invention. Those skilled in the art may now make numerous uses of, and departures from, the above-described embodiments without departing from the inventive concepts disclosed herein. Accordingly, the present invention is to be defined solely by the scope of the following claims.

We claim as our invention:

1. An electromagnetic actuator comprising:
    a magnetic flux conductive material case having a first case end, a second case end, and an interior wall extending between said first case end and said second case end, and a chamber confined by said interior wall;
    an electrical current conductive coil disposed in said chamber coextensively adjacent said wall, said coil having a first coil end disposed proximate said first case end, the second coil end disposed proximate said second case end, and a midpoint;
    a magnetic flux conductive material core having a first core end, a second core end, and an exterior wall extending between said first core end and said second core end, said exterior wall having a first region adjacent said first core end and a second region spaced from said first region adjacent said second core end, said core being movably received in said chamber with motion of said core occurring between said first case end and said second case end such that said first region traverses said coil between said first coil end and said midpoint and said second region traverses said coil between said second coil end and said midpoint, said coil and said exterior wall being in a facing relationship with respect to each other;
    a pair of magnetic elements, each of said elements having a first magnetic pole face of a first polarity and second magnetic pole face of a second polarity opposite said first polarity, a first one of said magnetic elements being carried by said first region with said first pole face thereof being adjacent said first region and said second pole face thereof being distal said first region in a spaced relationship to said coil, a second one of said magnetic elements being carried by said second region with said first pole face thereof being distal said second region in a spaced relationship to said coil and said second pole face thereof being adjacent said second region so that magnetic flux across said coil between said first region and said interior wall is in a first direction and magnetic flux across said coil between said second region and said interior wall is in a second direction opposite said first direction, said coil being arranged so that an electrical current in said coil between said first coil end and said midpoint flows in an opposite direction with respect to the direction of said current and said coil between said second coil end and said midpoint whereby the flux current cross products of said flux in said first direction with said current and the flux current cross products of said flux in said second direction in said current are additive.

2. An electromagnetic actuator is set forth in claim 1 wherein each of said magnetic elements include a plurality of flat permanent magnets disposed edge to edge on each respective one of said first region and said second region.

3. An electromagnetic actuator is set forth in claim 1 wherein said coil is continuously wound from said first coil end to said second coil end and includes a current input at said midpoint at a commonly connected current return at each of said first coil end and said second coil end.

4. An electromagnetic actuator is set forth in claim 1 wherein said coil is wound in a first direction between said first coil end and said midpoint, and counterwound in a second direction between said midpoint and said second coil end, and includes a current input at said first coil end and a current return at said second coil end.

5. An electromagnetic actuator is set forth in claim 1 wherein said actuator further comprises an eddy current suppression laminate disposed intermediate said interior wall and said coil.

6. An electromagnetic actuator is set forth in claim 1 wherein said coil is of edge wound construction.

7. An electromagnetic actuator comprising:
    a cylindrical magnetic flux conductive material case having a first case end, a second case end, and a cylindrical interior wall extending between said first case end and said second case end, and a chamber confined by said interior wall;
    an electrical current conductive coil coaxially disposed in said chamber coextensively adjacent said wall, said coil having a first coil end disposed proximate said first case end, the second coil end disposed proximate said second case end, and a midpoint;
    a cylindrical magnetic flux conductive material core having a first core end, a second core end, and a cylindrical exterior wall extending between said first core end and said second core end, said exterior wall having a first region adjacent said first core end and a second region spaced from said first region adjacent said second core end, said core being movably received coaxially in said chamber with motion of said core occurring between said first case end and said second case end such that said first region traverses said coil between said first coil end and said midpoint and said second region traverses said coil between said second coil end and said midpoint, said coil and said exterior wall being in a facing relationship with respect to each other;
    a pair of radially polarized magnetic elements, each of said elements having a first magnetic pole face of a first polarity and second magnetic pole face of a second polarity opposite said first polarity, a first one of said magnetic elements being carried by said first region with said first pole face thereof being adjacent said first region and said second pole face thereof being distal said first region in a spaced relationship to said coil, a second one of said magnetic elements being carried by said second region with said first pole face thereof being distal said second region in a spaced relationship to said coil and said second pole face thereof being adjacent said second region so that magnetic flux across said coil between said first region and said interior wall is in a first direction and magnetic flux across said coil between said second region and said interior wall is in a second direction opposite said first direction, said coil being arranged so that an electrical current in said coil between said first coil end and said midpoint flows in an opposite direction with respect to the direction of said current and said coil between said second coil end and said midpoint whereby the flux current cross products of said flux in said first direction with said current and the flux current cross products of said flux in said second direction in said current are additive.

8. An electromagnetic actuator is set forth in claim 7 wherein each of said magnetic elements include a plurality of flat permanent magnets disposed edge to edge on each respective one of said first region and said second region.

9. An electromagnetic actuator is set forth in claim 7 wherein said coil is continuously wound from said first coil end to said second coil end and includes a current input at said midpoint at a commonly connected current return at each of said first coil end and said second coil end.

10. An electromagnetic actuator is set forth in claim 7 wherein said coil is wound in a first direction between said first coil end and said midpoint, and counterwound in a second direction between said midpoint and said second coil end, and includes a current input at said first coil end and a current return at said second coil end.

11. An electromagnetic actuator is set forth in claim 7 wherein said actuator further comprises an eddy current suppression laminate disposed intermediate said interior wall and said coil.

12. An electromagnetic actuator is set forth in claim 7 wherein said coil is of edge wound construction.

* * * * *